(12) United States Patent
Burnell

(10) Patent No.: US 11,582,949 B2
(45) Date of Patent: Feb. 21, 2023

(54) SECURED GRIP PET GROOMING DEVICE

(71) Applicant: Penny Burnell, Sebring, FL (US)

(72) Inventor: Penny Burnell, Sebring, FL (US)

(73) Assignee: Penny Burnell, Sebring, FL (US)

( * ) Notice: Subject to any disclaimer, the term of this patent is extended or adjusted under 35 U.S.C. 154(b) by 994 days.

(21) Appl. No.: 16/373,731

(22) Filed: Apr. 3, 2019

(65) Prior Publication Data

US 2019/0313605 A1 Oct. 17, 2019

Related U.S. Application Data

(60) Provisional application No. 62/655,921, filed on Apr. 11, 2018.

(51) Int. Cl.
| | | |
|---|---|---|
| *A01K 13/00* | (2006.01) | |
| *B05B 1/18* | (2006.01) | |
| *A46B 11/00* | (2006.01) | |
| *A46B 11/06* | (2006.01) | |
| *A46B 5/02* | (2006.01) | |

(52) U.S. Cl.
CPC ............ *A01K 13/001* (2013.01); *A46B 5/021* (2013.01); *A46B 11/001* (2013.01); *A46B 11/0072* (2013.01); *B05B 1/185* (2013.01); *A46B 11/063* (2013.01)

(58) Field of Classification Search
CPC .... A01K 13/001; A01K 13/00; A01K 13/002; A01K 13/003; B05B 1/185; B05B 1/18; A46B 11/0072; A46B 11/001; A46B 5/021; A46B 5/02; A46B 5/023; A46B 5/025; A46B 5/04; A46B 11/00; A46B 11/06; A46B 11/063
USPC ......................... 401/6–8, 268, 270, 289, 291
See application file for complete search history.

(56) References Cited

U.S. PATENT DOCUMENTS

| | | | | |
|---|---|---|---|---|
| 3,130,442 | A | * | 4/1964 | Kellis ................. A47K 5/1201 401/278 |
| 6,481,443 | B1 | * | 11/2002 | Moore-Johnson ... A45D 29/007 132/73 |
| 6,542,951 | B1 | * | 4/2003 | Sangveraphunski ....................... G06F 13/387 709/215 |
| 6,718,913 | B1 | | 4/2004 | Stupar |
| 7,509,925 | B2 | | 3/2009 | Embry |
| 8,082,887 | B2 | | 12/2011 | Fernandez |

(Continued)

OTHER PUBLICATIONS https://www.amazon.com/WOWGO-Bathing-Scrubber-Grooming-Adapters/dp/B07F3KKK4P/ref=sr_1_1?ie=UTFB&qid-1551122400&sr=8-1&keywords=%2F-WOWGO+2018+NEWEST+Pet+Bathing+Tool+Dog+Shower+Sprayer+Scrubber+Grooming+Glove+with+3+Faucet+Adapters+for+Dog+Cat+Horse+Indoor+Outdoor+Use May 30, 2018.

(Continued)

*Primary Examiner* — David J Walczak

(57) ABSTRACT

A secured grip pet grooming device for use in aiding the de-shedding process while bathing a dog and decreasing stress on the animal. The secured grip pet grooming device includes a brush structure having a top surface, bottom surface, and plurality of sidewalls defining an internal reservoir therein. An adapter is configured to removably secure a water connection line to the brush structure in fluid communication, such as a hose. A plurality of bristles is disposed on the bottom surface of the brush structure, along with at least one vent in the surface having a channel extending into the internal reservoir and allowing liquid to pass therethrough. A handle is affixed to the top surface of the brush structure and includes at least one aperture adapted to receive the fingers of a user therethrough.

10 Claims, 4 Drawing Sheets

(56) References Cited

U.S. PATENT DOCUMENTS

| | | | |
|---|---|---|---|
| 8,336,558 B2* | 12/2012 | Hurwitz | A46B 5/021 |
| | | | 132/114 |
| 8,555,819 B1 | 10/2013 | McFarland | |
| 8,597,436 B2 | 12/2013 | Schreiber | |
| D703,957 S* | 5/2014 | Parsons | D28/63 |

OTHER PUBLICATIONS https://www.amazon.com/dp/B01HEK38IY/ref=cm_sw_em_r_mt_dp_U_euyECbCTHJY3V Mar. 1, 2019 New Multi-Functional Dog Shower Sprayer—Bath Massager Handheld Sprayer Shampoo Brush Grooming Tool for Dogs and Cats with 7.7 Feet Stainless Steel Hose, Indoor and Outdoor Use(Blue) by MIUPETby MIU Color Shop.

\* cited by examiner

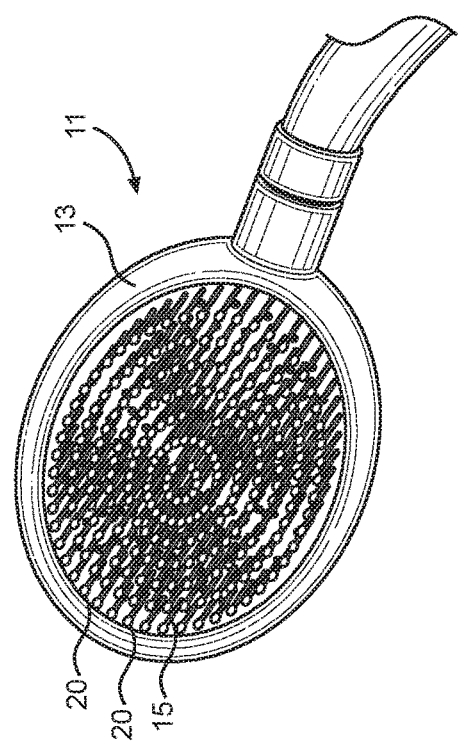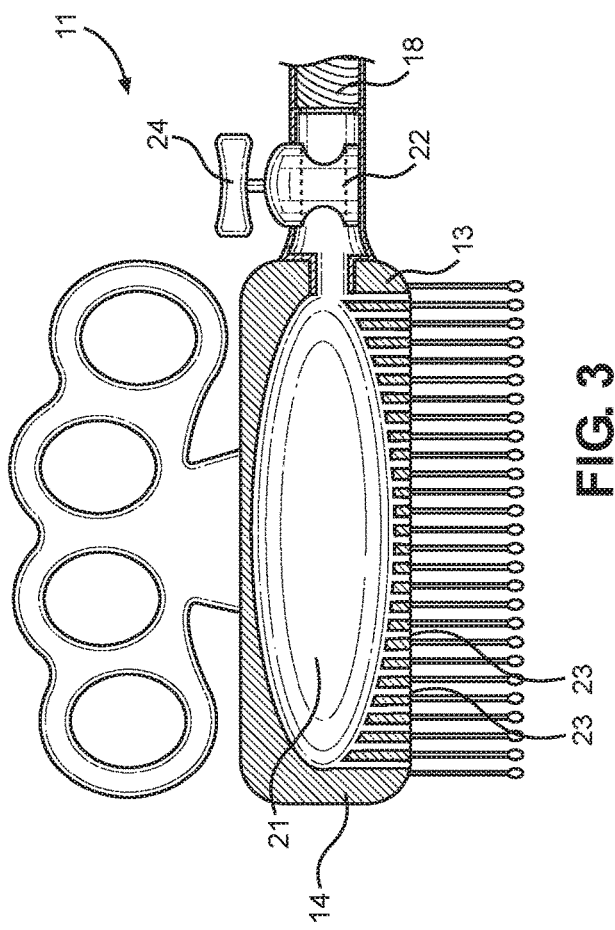

SECURED GRIP PET GROOMING DEVICE

CROSS REFERENCE TO RELATED APPLICATION

This application claims the benefit of U.S. Provisional Application No. 62/655,921 filed on Apr. 11, 2018. The above identified patent application is herein incorporated by reference in its entirety to provide continuity of disclosure.

BACKGROUND OF THE INVENTION

The present invention relates to handheld pet grooming devices. More specifically, the present invention provides a secured grip pet grooming device having a hose attachment and adapted handle wherein a plurality of apertures disposed thereon are configured to receive the fingers of a user therethrough.

Many households in many parts of the world possess pets that require constant grooming. Although grooming is often conducted by a professional groomer, the costs associated with professional grooming are usually expensive and require the time-consuming processes of scheduling a date and transporting your pet to the grooming facilities. Furthermore, a significant expenditure of time often occurs before a pet is given a bath wherefore a professional groomer often takes substantial time blowing or brushing out the hair of the pet that is to be groomed. As the time spent in grooming a pet increases, the pet often becomes restless or agitated which could cause added consternation, as well as the possibility of grooming mishaps and injuries. In addition, if the undercoat fails to be brushed or removed, pet owners often experience disappointment.

Devices have been disclosed in the prior art that relate to handheld pet grooming devices. These include devices that have been patented and published in patent application publications. These devices include handheld grooming brushes having a hose connection and flowrate control. Other devices include brushes having an ergonomic palm grip handle. These devices, however, fail to disclose a secured grip pet grooming device having all of the features of the present invention.

In light of the devices disclosed in the prior art, it is submitted that the present invention substantially diverges in design elements from the prior art and consequently it is clear that there is a need in the art for an improvement to existing handheld pet grooming devices. In this regard the instant invention substantially fulfills these needs.

SUMMARY OF THE INVENTION

In view of the foregoing disadvantages inherent in the known types of handheld pet grooming devices now present in the prior art, the present invention provides a new secured grip pet grooming device wherein the same can be utilized for providing convenience for the user when washing and grooming a pet while utilizing a more leveraged gripping position.

It is therefore an object of the present invention to provide a new and improved secured grip pet grooming device that has all of the advantages of the known art and none of the disadvantages.

It is another object of the present invention to provide a secured grip pet grooming device comprising a brush structure having a top surface, bottom surface, and plurality of sidewalls defining an interior reservoir wherein a plurality of bristles are disposed on the bottom surface thereof, and a handle having at least one aperture configured to receive the hand of a user therethrough extends orthogonally outward from the top surface thereof. An adapter configured to removably secure a water source connection in fluid communication wherein water is able to flow into the interior reservoir and out at least one vent disposed on the bottom surface via a channel connecting the vent and interior reservoir.

Another object of the present invention is to provide a secure grip pet grooming device wherein the plurality of bristles disposed on the bottom surface of the brush structure are comprised of either a rigid or semi-flexible construction as desired by a user and include a rounded tip on the distal end of the bristle to avoid scratching and injuring the pet during the grooming process.

Yet another object of the present invention is to provide a secure grip pet grooming device wherein the adapter disposed on a sidewall of the brush structure includes a flowrate control valve, such as a ball valve, operated using a switch on the adapter.

Still another object of the present invention is to provide a secure grip pet grooming device wherein the handle may comprise a plurality of apertures configured to ergonomically receive a single finger each therein.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2 shows a perspective view of an embodiment of the secured grip pet grooming device showing bottom surface.

FIG. 3 shows a cross-sectional view of an embodiment of the secured grip pet grooming device showing interior reservoir.

DETAILED DESCRIPTION OF THE INVENTION

Figure 1:
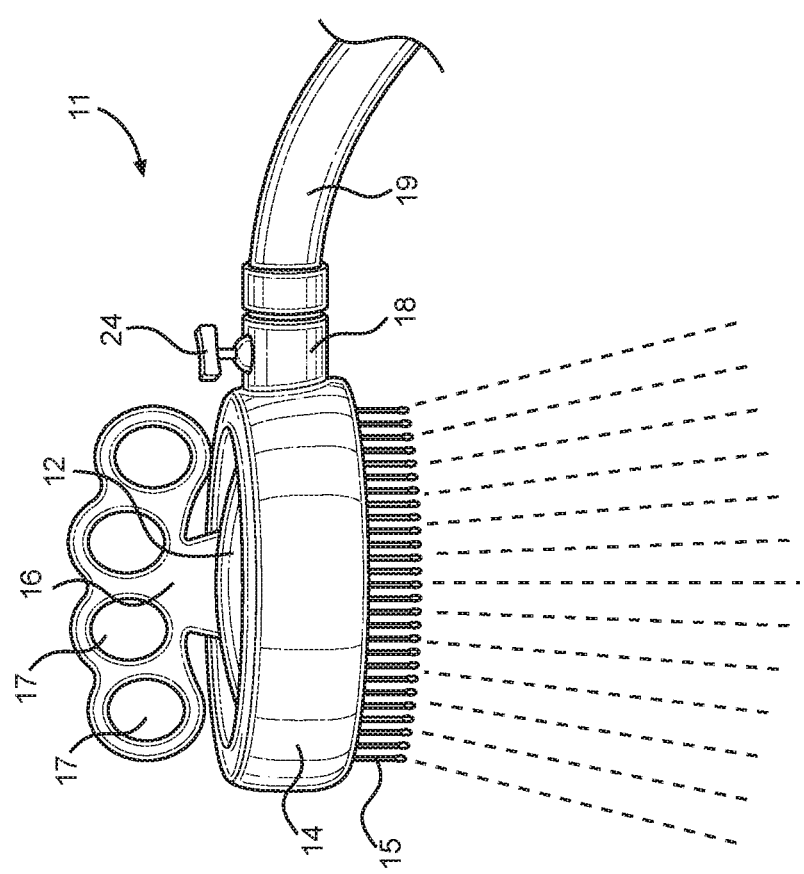
FIG. 1 shows a perspective view of an embodiment of the secured grip pet grooming device attached to a water connection.

Reference is made herein to the attached drawings. Like reference numerals are used throughout the drawings to depict like or similar elements of the secured grip pet grooming device. For the purposes of presenting a brief and clear description of the present invention, the preferred embodiment will be discussed as used for grooming a pet using a leveraged grip while simultaneous washing the pet and rinsing excess cleaner and removing shed fur from the grooming bristles. The figures are intended for representative purposes only and should not be considered to be limiting in any respect.

Referring now to FIG. 1, there is shown a perspective view of an embodiment of the secured grip pet grooming device attached to a water connection. The secured grip pet grooming device 11 comprises n brush structure having a top surface 12, bottom surface 13, and sidewalls 14. These exterior surfaces define an interior reservoir within the brush structure. In the illustrated embodiment, the brush structure comprises a substantially ovular shape having a rounded sidewall 14, a planar top surface 12 and a planar bottom surface 13. A plurality of bristles 15 is disposed along the bottom surface of the brush structure. Each bristle of the plurality of bristles 15 has a proximal end affixed to the bottom surface 13 of the brush structure and a distal end which extends orthogonally outward from the bottom surface 13 thereon. A handle 16 extends orthogonally outward from the top surface 12 of the brush structure and includes a plurality of gripping apertures 17 adapted to receive the fingers of a user therethrough. An adapter 18 is disposed in the sidewalls 14 and configured to receive a water connection line 19, such as a hose, in liquid communication thereon.

Referring now to FIG. 2, there is shown a perspective view of an embodiment of the secured grip pet grooming device showing bottom surface. The plurality of bristles 15 disposed along the bottom surface 13 of the secured grip pet grooming device 11 are arranged in rows and columns with spaced channels defined therebetween. The spaced channels defined by the plurality of bristles 15 allow for the fur of an animal being groomed to pass through the bristles 15 when being groomed by a user. In alternate embodiments, the plurality of bristles 15 can comprise a rigid or semi-stiff construction as desired for different grooming needs. In the illustrated embodiment of the secured grip pet grooming device 11, rounded tips 20 are included on the distal end of the plurality of bristles 15. The rounded tips 20 protect the skin of the animal being groomed from potential scratching and irritation that may be caused by the plurality of bristles during the grooming process.

Referring now to FIG. 3, there is shown a cross-sectional view of an embodiment of the secured grip pet grooming device showing interior reservoir. The interior reservoir 21 defined within the brush structure is adapted to receive liquid therein. The adapter 18 disposed in the sidewall 14 allows for a water connection line 19 to be removably affixed to the secured grip pet grooming device 11 in liquid communication such that water may flow from the connection line 19 into the interior reservoir 21. In the illustrated embodiment, the adapter 18 comprises a threaded female adaption to allow for a connection line to be secured within but may comprise different adapters, such as a male adapter, in other embodiments of the device 11. A flowrate valve 22 is included within the adapter 18 to regulate the intake of water from the connection line 19 into the interior reservoir 21. A switch 24 disposed on the exterior of the adapter 18 allows for a user to selectively perform this regulation through manual operation. In the illustrated embodiment, the flowrate valve 22 is comprised of a ball valve.

At least one flow vent 23 is disposed on the bottom surface 13 of the brush structure. A channel connects the flow vents 23 with the interior reservoir 21. These flow apertures 23 allow for water to be expelled therethrough via the channel from the interior reservoir 21. The water expelled through the flow vents 23 allows for simultaneous rinsing and brushing of a pet during the grooming process.

In the illustrated embodiment, the flow vents 23 have an opening comprising a circular cross section to allow for a jet-like stream of water. In other embodiments of the secure grip pet grooming device 11, the openings of the flow vents 23 each comprise an elongated slot to allow for a more fan-like spray of water.

Figure 5:
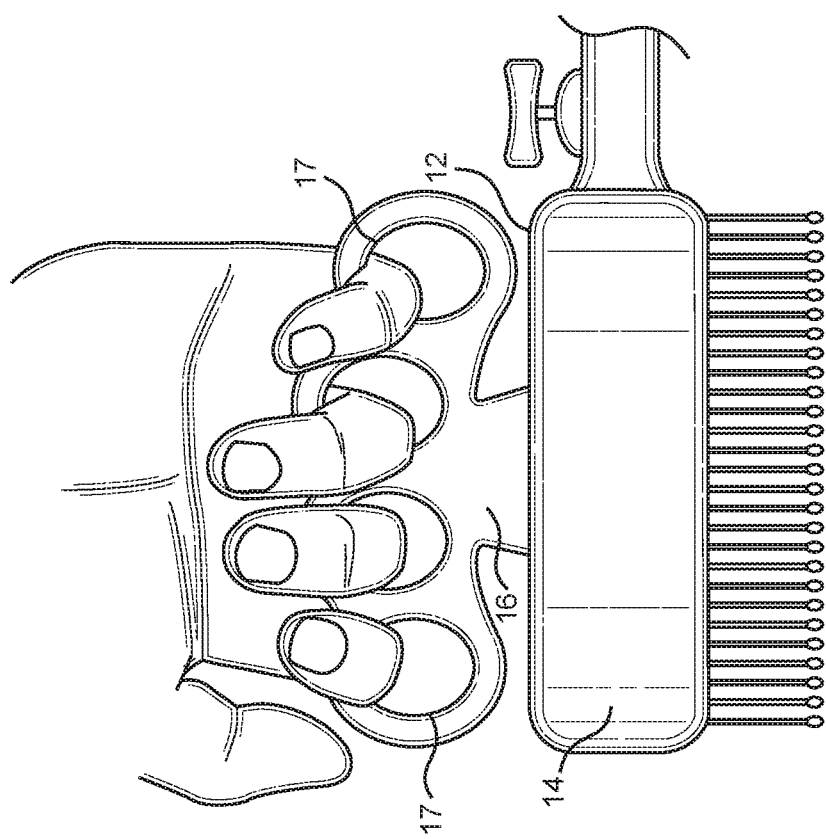
FIG. 5 shows a perspective view of an embodiment of the secured grip pet grooming device showing the device being held in an overhand grip.
Figure 4:
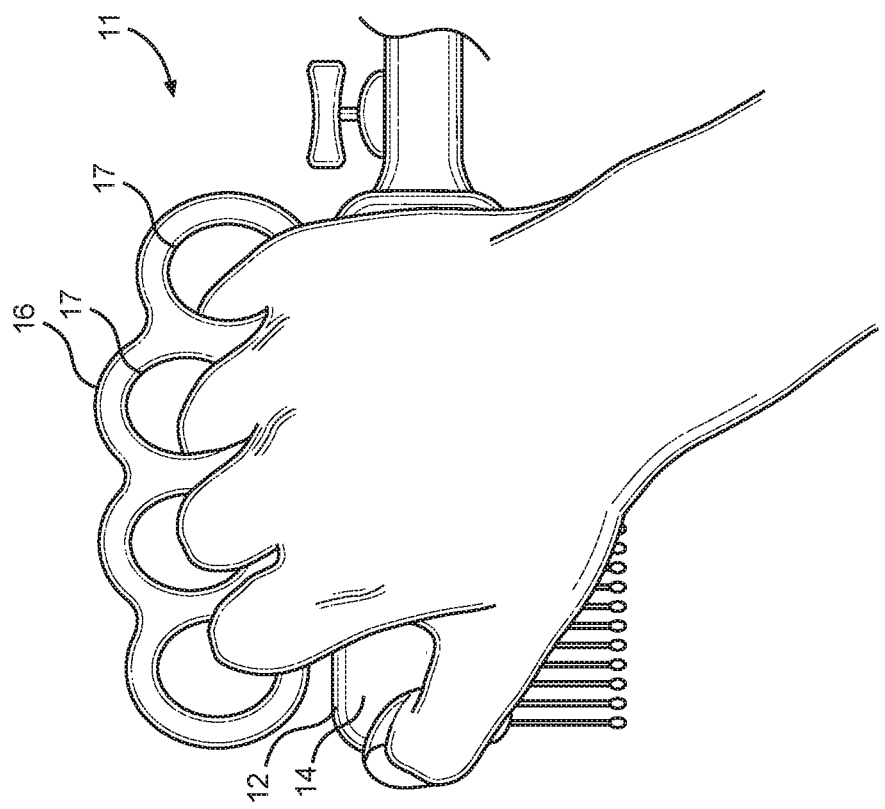
FIG. 4 shows a perspective view of an embodiment of the secured grip pet grooming device showing the device being held in a side grip.

Referring now to FIGS. 4 and 5, there are shown a perspective view of an embodiment of the secured grip pet grooming device being held in a side grip and a perspective view of an embodiment of the secured grip pet grooming device being held in an overhand grip, respectively. The handle 16 extends outwardly from the top surface 12 of the brush structure. In the illustrated embodiment, the handle 16 comprises a planar protrusion including a plurality of gripping apertures 17 adapted to receive the fingers of a user therethrough. As shown, the handle 16 is used to hold the device in either a side grip (as shown in FIG. 4) or an overhand grip (as shown in FIG. 5). The side grip is defined wherein a user puts their fingers through the gripping apertures 17 such that the palm of their hand will face down towards the top surface 12 of the brush structure. Further, the fingertips will reach over and grip the sidewall 14 on the far side while a user's thumb and the ridge of their palm would lay flush against the sidewall 14 of the near side. The overhand grip is defined when a user places their fingers through the gripping apertures 17 with their palm faced upward, away from the top surface 12 of the brush structure and curls their fingers back towards their palm such that the handle 16 is within their gripped fist.

Figure 6:
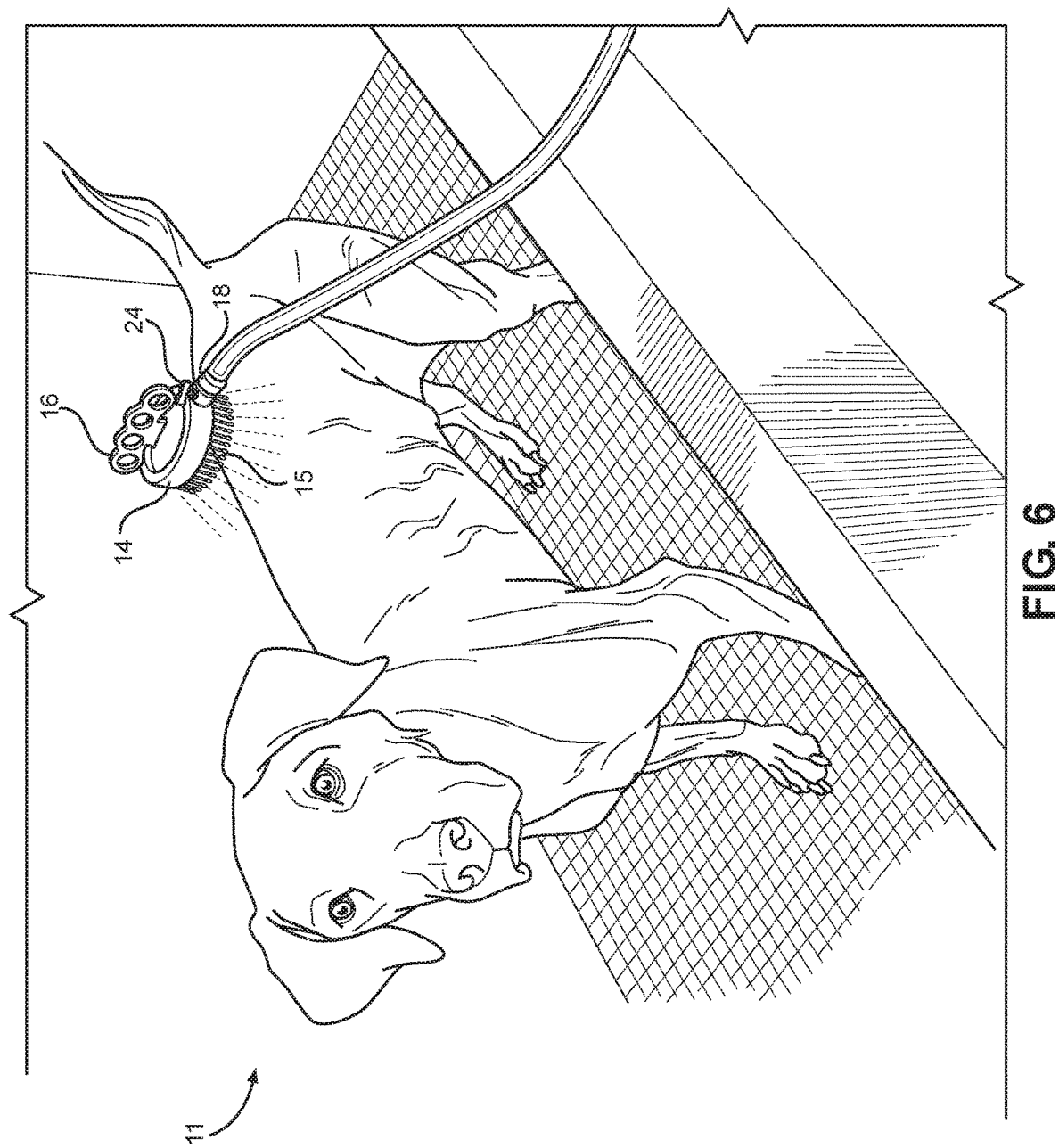
FIG. 6 shows a perspective view of an embodiment of the secured grip pet grooming device in use on a dog.

Referring now to FIG. 6, there is shown a perspective view of an embodiment of the secured grip pet grooming device in use on a dog. In practice, the secured grip pet grooming device 11, is attached in liquid communication to a hose via the adapter 18 disposed in the sidewall 14 of the brush structure. Water flowing through the hose will pass into the interior reservoir and be expelled through the flow vents disposed on the bottom surface of the device 11. The water may be controlled using the flowrate valve of the adapter 18 by operating the valve switch 24 as desired. A user may grip the device 11 using a side or overhand grip on the handle 16 as desired depending on whether they want more control or leverage. The user may then manually groom an animal by passing the bottom surface of the brush structure over the animal's coat such that the plurality of bristles 15 passes through the coat to brush out the fur and prevent any tangles. The water passing through the flow vents 23 allows for the coat to be washed as well as softening any knots to better allow the bristles to pass through the coat. In some embodiments of the secured grip pet grooming device 11, the flow vents 23 are concentrated on a side portion of the bottom surface away from the plurality of bristles 15. This allows for the water to be washed over the fur of the animal being groomed first to soften and separate the hairs before being passed through the plurality of bristles 15. Washing in this fashion may leave less streak patterns in the fur for a more even grooming appearance.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A secured grip pet grooming device, comprising:
a brush structure having a rounded top surface, a bottom surface, and a plurality of sidewalls defining an interior reservoir within the brush structure;
a T-shaped handle having a stem with a lower portion affixed to the rounded top surface of the brush structure and an arcuate upper cross-piece positioned on an upper portion of the stem;
the arcuate upper cross-piece having a plurality of apertures disposed therethrough, the plurality of apertures configured to receive at least one finger of a user therethrough;
a plurality of bristles disposed along the bottom surface of the brush structure and protruding outward therefrom;
an adapter disposed in a sidewall and extending laterally from the brush structure which is configured to receive, and removably secure, a water source thereon in fluid communication;
at least one vent within the bottom surface of the brush structure having a channel into the interior reservoir within the brush structure;
a flowrate valve disposed within the adapter, whereby the flowrate valve is adapted to be sandwiched between a water source line and the interior reservoir; and
a valve switch disposed on the adapter, whereby the valve switch is operably connected to the flowrate valve.

2. The secured grip pet grooming device of claim 1, wherein the plurality of bristles is comprised of rigid protrusions extending outwardly from the bottom surface of the brush structure.

3. The secured grip pet grooming device of claim 1, wherein the plurality of bristles is comprised of semi-flexible protrusions extending outwardly from the bottom surface of the brush structure.

4. The secured grip pet grooming device of claim 1, wherein a rounded tip is included on the distal end of each of the plurality of bristles.

5. The secured grip pet grooming device of claim 1, wherein the bottom surface of the brush structure allows the plurality of bristles disposed thereon to conform to the shape and contours of the pet's body.

6. The secured grip pet grooming device of claim 1, wherein the adapter is a male adapter having a threaded exterior configured to removably couple with a female adapter disposed on the end of a water source.

7. The secured grip pet grooming device of claim 1, wherein the adapter is a female adapter having a threaded interior configured to removably couple with a male adapter disposed on the end of a water source.

8. The secured grip pet grooming device of claim 1, wherein the flowrate valve is comprised of a ball valve operated via the valve switch disposed on the adapter.

9. The secured grip pet grooming device of claim 1, wherein the at least one vent within the bottom surface of the brush structure are adapted to receive fluid from the interior reservoir therethrough.

10. The secured grip pet grooming device of claim 9, wherein the at least one vent within the bottom surface of the brush structure are comprised of slits which spray fluid expelled therethrough in a fan-like configuration.

* * * * *